US011082279B2

(12) United States Patent
Nammi et al.

(10) Patent No.: US 11,082,279 B2
(45) Date of Patent: Aug. 3, 2021

(54) FACILITATION OF REDUCTION OF PEAK TO AVERAGE POWER RATIO FOR 5G OR OTHER NEXT GENERATION NETWORK

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/144,646

(22) Filed: Sep. 27, 2018

(65) Prior Publication Data
US 2020/0106656 A1 Apr. 2, 2020

(51) Int. Cl.
*H04L 5/00* (2006.01)
*H04L 27/34* (2006.01)
*H04W 72/04* (2009.01)

(52) U.S. Cl.
CPC ........ *H04L 27/3411* (2013.01); *H04L 5/0048* (2013.01); *H04W 72/048* (2013.01)

(58) Field of Classification Search
None
See application file for complete search history.

(56) References Cited

U.S. PATENT DOCUMENTS

| 5,991,262 | A | 11/1999 | Laird et al. |
| 6,125,103 | A | 9/2000 | Bauml et al. |
| 6,128,350 | A | 10/2000 | Shastri et al. |
| 7,266,156 | B2 | 9/2007 | Montojo et al. |
| 7,340,006 | B2 | 3/2008 | Yun et al. |
| 7,418,041 | B2 | 8/2008 | Jung et al. |
| 7,583,583 | B2 | 9/2009 | Guo et al. |
| 7,839,947 | B2 | 11/2010 | Clausen et al. |
| 8,135,081 | B2 | 3/2012 | Moffatt et al. |
| 8,213,293 | B2 | 7/2012 | Lee et al. |
| 8,358,711 | B2 | 1/2013 | Marsili |

(Continued)

FOREIGN PATENT DOCUMENTS

| CN | 107046513 A | 8/2017 |
| EP | 2 264 937 A2 | 12/2010 |

(Continued)

OTHER PUBLICATIONS

Non-Final Office Action received for U.S. Appl. No. 16/156,710 dated Jun. 10, 2019, 29 pages.

(Continued)

*Primary Examiner* — Ajit Patel
*Assistant Examiner* — Pamit Kaur
(74) *Attorney, Agent, or Firm* — Amin, Turocy & Watson, LLP

(57) ABSTRACT

Because the number of transmitted layers can vary dynamically, the number of transmitted demodulation reference signals (DM-RS) can also vary. However, because the network node can know the number of ports, transmitted layers, or the rank, the network node can utilize the number as part of the scheduling information via a downlink or an uplink control channel. Therefore, the DMRS sequence generation can modified such that it depends on the number of ports, transmitted layers, or the rank, thereby generating a different random sequence for different ports.

20 Claims, 13 Drawing Sheets

(56) References Cited

U.S. PATENT DOCUMENTS

| | | |
|---|---|---|
| 8,472,537 B2 | 6/2013 | Browning et al. |
| 8,571,000 B2 | 10/2013 | Zhou et al. |
| 8,774,258 B2 | 7/2014 | Tadano |
| 8,798,181 B1 | 8/2014 | Terry |
| 8,824,574 B2 | 9/2014 | Mccallister et al. |
| 9,363,736 B2 | 6/2016 | Griot et al. |
| 9,503,301 B2 | 11/2016 | Dick |
| 9,544,160 B2 | 1/2017 | Kim et al. |
| 9,577,779 B2 | 2/2017 | Vilaipornsawai et al. |
| 9,635,529 B2 | 4/2017 | Kruglick et al. |
| 9,641,373 B2 | 5/2017 | Zeng et al. |
| 9,848,410 B2 | 12/2017 | Ouchi et al. |
| 9,877,254 B2 | 1/2018 | Gholmieh et al. |
| 9,893,919 B2 | 2/2018 | Kim et al. |
| 10,051,654 B2 | 8/2018 | Tooher et al. |
| 2002/0168016 A1 | 11/2002 | Wang et al. |
| 2007/0071120 A1 | 3/2007 | Talwar |
| 2010/0246527 A1 | 9/2010 | Montojo et al. |
| 2010/0272040 A1 | 10/2010 | Nam et al. |
| 2011/0038344 A1 | 2/2011 | Chmiel et al. |
| 2011/0075651 A1 | 3/2011 | Jia et al. |
| 2011/0228877 A1 | 9/2011 | Han et al. |
| 2011/0249767 A1 | 10/2011 | Chen et al. |
| 2012/0106610 A1 | 5/2012 | Nogami et al. |
| 2013/0077660 A1 | 3/2013 | Ko et al. |
| 2013/0114536 A1 | 5/2013 | Yoon |
| 2015/0163781 A1* | 6/2015 | Kim ............ H04L 1/02 370/329 |
| 2015/0304153 A1 | 10/2015 | Moffatt et al. |
| 2016/0173255 A1 | 6/2016 | Lee et al. |
| 2017/0237592 A1 | 8/2017 | Yang et al. |
| 2017/0310442 A1 | 10/2017 | Noh et al. |
| 2018/0026684 A1* | 1/2018 | Wei ............ H04B 7/0452 370/329 |
| 2018/0115331 A1 | 4/2018 | Lange et al. |
| 2018/0123747 A1 | 5/2018 | Wang et al. |
| 2018/0131418 A1* | 5/2018 | Wang ............ H04B 7/0456 |
| 2018/0131485 A1 | 5/2018 | Wang et al. |
| 2018/0198495 A1* | 7/2018 | Davydov ............ H04J 13/004 |
| 2018/0198657 A1 | 7/2018 | Aiba et al. |
| 2018/0198668 A1 | 7/2018 | Kim et al. |
| 2018/0205586 A1 | 7/2018 | Park et al. |
| 2018/0234223 A1 | 8/2018 | Nakao et al. |
| 2018/0234277 A1 | 8/2018 | Akkarakaran et al. |
| 2018/0241603 A1 | 8/2018 | Jia et al. |
| 2018/0254867 A1 | 9/2018 | Kim et al. |
| 2018/0278396 A1 | 9/2018 | Yang et al. |
| 2018/0287680 A1 | 10/2018 | Xu et al. |
| 2018/0302905 A1 | 10/2018 | Fodor et al. |
| 2018/0316469 A1 | 11/2018 | Jiang et al. |
| 2018/0324005 A1 | 11/2018 | Kim et al. |
| 2018/0324787 A1 | 11/2018 | Yin et al. |
| 2019/0037376 A1 | 1/2019 | Liu et al. |
| 2019/0165913 A1 | 5/2019 | He et al. |
| 2019/0215119 A1* | 7/2019 | Kim ............ H04L 5/005 |
| 2019/0222457 A1 | 7/2019 | Wei et al. |
| 2019/0320457 A1 | 10/2019 | Maaref et al. |
| 2020/0014569 A1 | 1/2020 | Huang et al. |
| 2020/0053660 A1 | 2/2020 | Ji et al. |
| 2020/0068608 A1 | 2/2020 | Ye et al. |
| 2020/0112467 A1 | 4/2020 | Shen et al. |
| 2020/0120644 A1 | 4/2020 | Zhou et al. |
| 2020/0204335 A1* | 6/2020 | Kim ............ H04L 27/261 |

FOREIGN PATENT DOCUMENTS

| | | |
|---|---|---|
| WO | 2018081107 A1 | 6/2015 |
| WO | 2016174165 A2 | 11/2016 |
| WO | 2017121390 A1 | 7/2017 |
| WO | 2018/049035 A1 | 3/2018 |
| WO | 2018060969 A1 | 4/2018 |

OTHER PUBLICATIONS

Lin, Xingqin, et al. "5G New Radio: Unveiling the Essentials of the Next Generation Wireless Access Technology." arXiv preprint arXiv: 1806.06898 (2018). 8 pages. https://arxiv.org/pdf/1806.06898.

Molano Ramos, Juan Sebastian, et al. "New Radio Interfaces Beyond 4G" Politecnico di Torino, 2018. 53 pages. https://webthesis.biblio.polito.it/7611/1/tesi.pdf.

Guo, Jiabing. "Design and implementation of LTE-A and 5G kernel algorithms on SIMD vector processor." KTH Royal Institute of Technology (2015). 83 pages. http://www.diva-portal.org/smash/get/diva2 : 785081/FULLTEXTO 1. pdf.

Elsaadany, Mahmoud, et al. "Cellular LTE-A Technologies for the Future Internet-of-Things: Physical Layer Features and Challenges." IEEE Communications Surveys & Tutorials 19.4 (2017): 2544-2572. 28 pages. https://fardapaper. ir/mohavaha/uploads/2017/10/Cellular-LTE-ATechnologies.pdf.

Notice of Allowance received for U.S. Appl. No. 16/156,710 dated Jan. 15, 2020, 27 pages.

International Search Report and Written Opinion received for PCT Application Serial No. PCT/US2019/054810 dated Jan. 20, 2020, 15 pages.

Ericsson: "On correlation of DMRS Gold sequences",URL:http://www.3gpp.org/ftp/Meetings%5F3GPP%5FSYNC/RAN1/Docs/vol. RAN WG1, No. Busan, Korea, May 20, 2018, 4 pages.

International Search Report and Written Opinion received for PCT Application Serial No. PCT/US2019/047584 dated Dec. 9, 2019, 42 pages.

Ericsson: "Benefits of resource specific DMRS mapping",URL : http://www.3gpp.org/ftp/Meetings%5F3GPP%5FSYNC/RAN1/Docs/, vol. No. Busan, May 20, 2018, 4 pages.

Ericsson: "On high PAPR in rank 2 transmissions with FDM of DMRS ports" URL:http://www.3gpp.org/ftp/Meetings%5F3GPP%5FSVNC/RAN1/Docs/vol. RAN WG1, No. Busan, Korea, May 20, 2018, 2 pages.

Non-Final Office Action received for U.S. Appl. No. 16/440,874 dated Sep. 9, 2020, 62 pages.

Non-Final Office Action received for U.S. Appl. No. 16/847,825 dated Aug. 25, 2020, 31 pages.

International Search Report and Written Opinion received for PCT Application Serial No. PCT/US2019/058984 dated Feb. 17, 2020, 13 pages.

Ericsson, "0n specification-based solutions to the DMRS PAPR issue" URL:http://www.3gpp.org/ftp/tsg%5Fran/WG1%5FRL1/TSGR1%5F94b/Docs/R1%2D1811542%2Ezip, Sep. 29, 2018, 5 pages.

Final Office Action received for U.S. Appl. No. 16/156,710 dated Sep. 30, 2019, 11 pages.

Final Office Action received for U.S. Appl. No. 16/440,874 dated Jan. 29, 2021, 62 pages.

Notice of Allowance received for U.S. Appl. No. 16/847,825 dated Feb. 8, 2021, 25 pages.

International Preliminary Report on Patentability dated Apr. 22, 2021 for PCT/US2019/054810, 8 pages.

International Preliminary Report on Patentability dated May 14, 2021 for PCT/US2019/058984, 8 pages.

International Preliminary Report on Patentability dated Apr. 8, 2021 for PCT/US2019/047584, 11 pages.

* cited by examiner

FACILITATION OF REDUCTION OF PEAK TO AVERAGE POWER RATIO FOR 5G OR OTHER NEXT GENERATION NETWORK

TECHNICAL FIELD

This disclosure relates generally to facilitating a reduction of peak to average power ratios. For example, this disclosure relates to modifying demodulation reference signal (DMRS) sequence to generate a different random sequence to reduce the peak to average power ratio 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to reducing peak to average power ratios is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
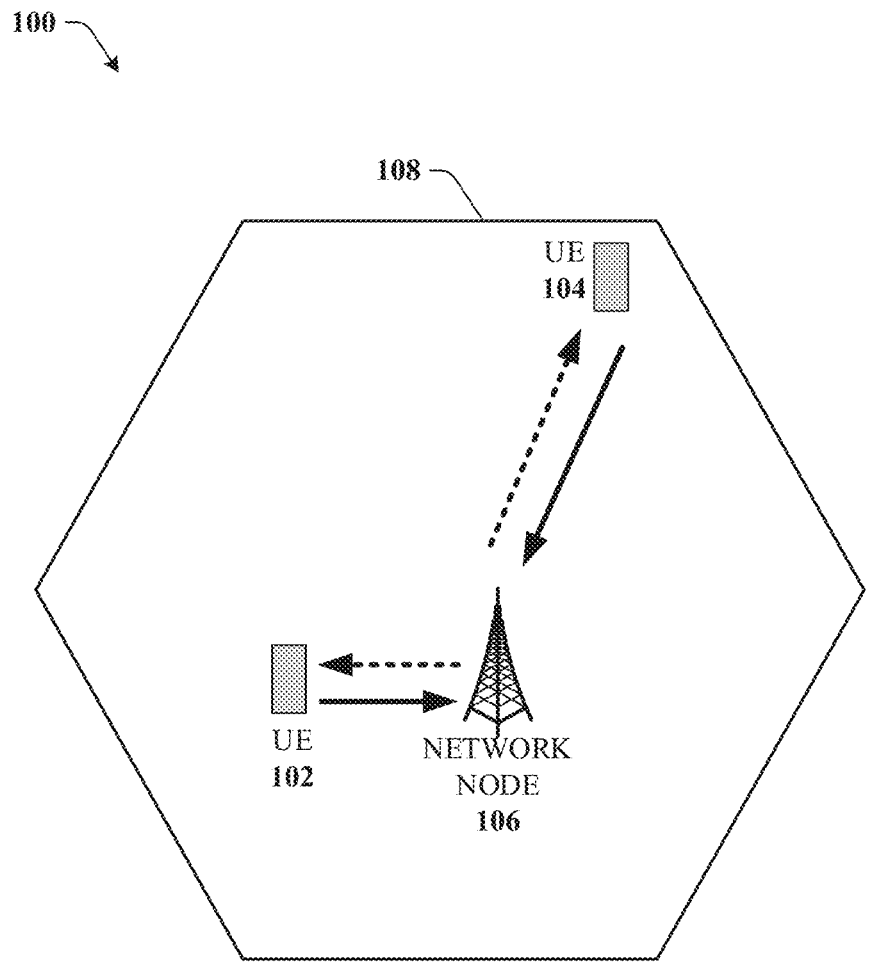
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate reducing peak to average power ratios for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate reducing peak to average power ratios for a 5G network. Facilitating sub-band channel quality indicator reporting for frequency selective scheduling for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as orthogonal frequency division multiplexing (OFDM), each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels.

The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

A physical downlink control channel (PDCCH) can carry information about scheduling grants. Typically this comprises a of number of multiple-in multiple-out (MIMO) layers scheduled, transport block sizes, modulation for each code word, parameters related to a hybrid automatic repeat request (HARQ), sub band locations etc. It should be noted that all downlink control information (DCI) formats may not transmit all the information as shown above. In general, the contents of PDCCH can depend on a transmission mode and a DCI format. Typically, the following information is transmitted by means of the DCI format: carrier indicator, identifier for dci formats, bandwidth part indicator, frequency domain resource assignment, time domain resource assignment, virtual resource block (VRB) to physical resource block (PRB) mapping flag, PRB bundling size indicator, rate matching indicator, zero-punctuation (ZP) CSI-RS trigger, modulation and coding scheme for each transport block (TB), new data indicator for each TB, redundancy version for each TB, HARQ process number, downlink assignment index, transaction processing benchmark (TPC) command for uplink control channel, physical uplink control channel (PUCCH) resource indicator, physical downlink scheduling channel to HARQ feedback timing indicator, antenna port(s), transmission configuration indication, system requirement specification (SRS) request, cbg transmission information, cbg flushing out information, and/or dmrs sequence initialization.

The uplink control channel can carry information about HARQ-acknowledgment (ACK) information corresponding to the downlink data transmission, and channel state information. The channel state information typically comprise: CRI, RI, CQI, PMI and layer indicator data, etc. The CSI can be divided into two categories: one for sub-band and the other for wideband. The configuration of sub-band or wideband CSI reporting can be done through RRC signaling as part of CSI reporting configuration. Table 1 depicts the contents of a CSI report for PMI format indicator=Wideband, CQI format indicator=wideband and for PMI format indicator=sub-band, CQI format indicator=sub-band.

TABLE 1

Contents of CSI report for both wideband and side band

| PMI-Format Indicator = wideband PMI and CQI-Format Indicator = wideband CQI | PMI-Format Indicator = sub-band PMI or CQI-Format Indicator = sub-band CQI | | |
|---|---|---|---|
| | | CSI Part II | |
| | CSI Part I | wideband | sub-band |
| CRI | CRI | Wideband CQI for the second TB | Sub-band differential CQI for the second TB (transport block) of all even sub-bands |

TABLE 1-continued

Contents of CSI report for both wideband and side band

| | PMI-Format Indicator = sub-band PMI or CQI-Format Indicator = sub-band CQI | |
|---|---|---|
| PMI-Format Indicator = wideband PMI and CQI-Format Indicator = wideband CQI | CSI Part I | CSI Part II |
| | | wideband sub-band |
| Rank Indicator | Rank Indicator | PMI wideband (X1 and X2)    PMI sub-band information fields X$_2$ of all even sub-bands |
| Layer Indicator | Layer Indicator | —    Sub-band differential CQI for the second TB of all odd sub-bands |
| PMI wideband (X1 and X2) | Wideband CQI | —    PMI sub-band information fields X$_2$ of all odd sub-bands |
| Wideband CQI | Sub-band differential CQI for the first TB | —    — |

Note that for NR, the sub-band is defined according to the bandwidth part of the OFDM in terms of PRBs as shown in Table 2. The sub-band configuration is also done through RRC signaling.

TABLE 2

Configurable sub-band sizes

| Carrier bandwidth part (PRBs) | Sub-band Size (PRBs) |
|---|---|
| <24 | N/A |
| 24-72 | 4, 8 |
| 73-144 | 8, 16 |
| 145-275 | 16, 32 |

According to the existing 5G NR standard, the UE should report sub-band CQI as a differential CQI to reduce the uplink overhead. The differential sub-band CQI can be defined. As each sub-band index s, a 2-bit sub-band differential CQI can be defined as sub-band offset level (s)=wideband CQI index−sub-band CQI index (s).

Similar to LTE, in NR, an OFDM waveform can be used for both downlink and uplink transmissions. The transmission signals in an OFDM system can have high peak values in the time domain since many subcarrier components are added via an inverse fast fourier transform (IFFT) operation. Therefore, OFDM systems can have a high peak to average power ratio (PAPR) as compared with single-carrier systems. High PAPR can be detrimental to the OFDM system, as it decreases the signal to quantization Noise Ratio (SQNR) of analog-to-digital converter (ADC) and digital to analog converter (DAC) while degrading the efficiency of the power amplifier in the transmitter.

In specific cases, in the NR design for demodulation reference signals (DMRS), the symbols can be repeated for ports 2 and 3. However, when the symbols are repeated, the peak to average power ratio (PAPR) increases. Since there is an increase in PAPR due to DMRS repetition, this can result in the system operating in a saturation region of the power amplifier and can result in out of band emissions. Therefore, the system cannot be operated according to specification limits.

In the proposed technique, a DMRS sequence generation can be modified such that it depends on the transmission layer/rank/port, thereby generating a different random sequence for different ports. The different random sequence can be different than a previous sequence associated with a different port. The main principle behind the proposed technique is to generate a random sequence, which is dependent on the port/layer/rank thereby avoiding the repetition for ports 2 and 3. This can reduce the PAPR problem for NR. Thus, the PAPR can be reduced and can be equal to that of data. It should be noted that for purposes of this disclosure that the terms port, layer, and rank can be used interchangeably.

As the number of transmitted layers can vary dynamically, the number of transmitted DMRS can also vary. However, the network node can know the number of transmitted layers (a.k.a., port or rank) and utilize the number as part of scheduling information via a downlink or an uplink control channel. Thus, the NR can schedule transmission ranks greater than 2 without using a power back off of an amplifier. The network node can generate a random DMRS sequence dependent upon a port number that the base station is aware of. The base station can determine which port to use based on rank data and then generate the DMRS sequence. The base station can then place the DMRS sequence in an OFDM grid and then transmit to the UE. This can increase the link and system throughput of the 5G system and provide gains over conventional techniques. Currently, the DMRS sequence does not depend on the layer, and the ports can use the same DMRS sequence. For example, port 0 and port 1 can have the same sequence and port 2 and port 3 can have the same sequence. However, port 1 and port 2 can have different sequences based on their port numbers as presented in this disclosure. Thus, if the DMRS sequence for different ports is randomized based on the layer, then the PAPR can decrease. The method to generate the sequence for DMRS is explained as below. The UE can assume the sequence r(n) can be defined by:

$$r(n)=1/\sqrt{2}(1-2\cdot c(2n))+j1/\sqrt{2}(1-2\cdot c(2n+1)), \quad \text{Equation (1):}$$

where the pseudo-random sequence c(i) can be defined as:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{Equation (2):}$$

where $N_C=1600$ and the first m-sequence $x_1(n)$ can be initialized with $x_1(0)=1$, $x_1(n)=0, n=1, 2, \ldots, 30$. The initialization of the second m-sequence, $x_2(n)$, can be denoted by:

$$c_{init}=\Sigma_{i=0}^{30} x_2(i)\cdot 2^i \quad \text{Equation (3):}$$

with the value depending on the application of the sequence. The pseudo-random sequence generator can be initialized via:

$$c_{init}=(2^{17}(N_{suab}{}^{slot}n_{s,f}{}^{\mu}+l+1)(2N_{ID}{}^{nSCID}+1)+2N_{ID}{}^{nSCID}+n_{SCID})\bmod 2^{31} \quad \text{Equation (3):}$$

where l is the Oxs symbol number within the slot, $n_{s,f}{}^{\mu}$ is the slot number within a frame, and F is a function F(x), where F can be linear or non-linear.

In one embodiment, described herein is a method comprising receiving, by a mobile device comprising a processor selecting, by a wireless network device comprising a processor, a port of a wireless network to be used in a wireless network transmission. Based on port data associated with the port of the wireless network, the method can comprise generating, by the wireless network device, a demodulation reference signal sequence. Additionally, the method can comprise transmitting, by the wireless network device, demodulation reference signal sequence data, associated with the demodulation reference signal sequence, to a mobile device of the wireless network.

According to another embodiment, a network device can facilitate, selecting a port of a wireless network to be used in a wireless network transmission. Based on port data associated with the port of the wireless network, the network device can generate a reference signal sequence. Furthermore, in response to the generating, the network device can transmit reference signal sequence data, associated with the reference signal sequence, to a mobile device of the wireless network.

According to yet another embodiment, described herein is a machine-readable storage medium that can perform the operations comprising generating a demodulation reference signal sequence associated with the wireless network. The machine-readable storage medium can perform operations comprising selecting a port of the wireless network to be used in a wireless network transmission. Based on port data associated with the port of the wireless network, the machine-readable storage medium can perform operations comprising generating a modified demodulation reference signal sequence. Additionally, the machine-readable storage medium can perform operations comprising transmitting demodulation reference signal sequence data, associated with the modified demodulation reference signal sequence, to a mobile device of the wireless network.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102, 104. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network.

The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks 106 that facilitate providing wireless communication services to various UEs, including UE 102, via the network node 106 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 106 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
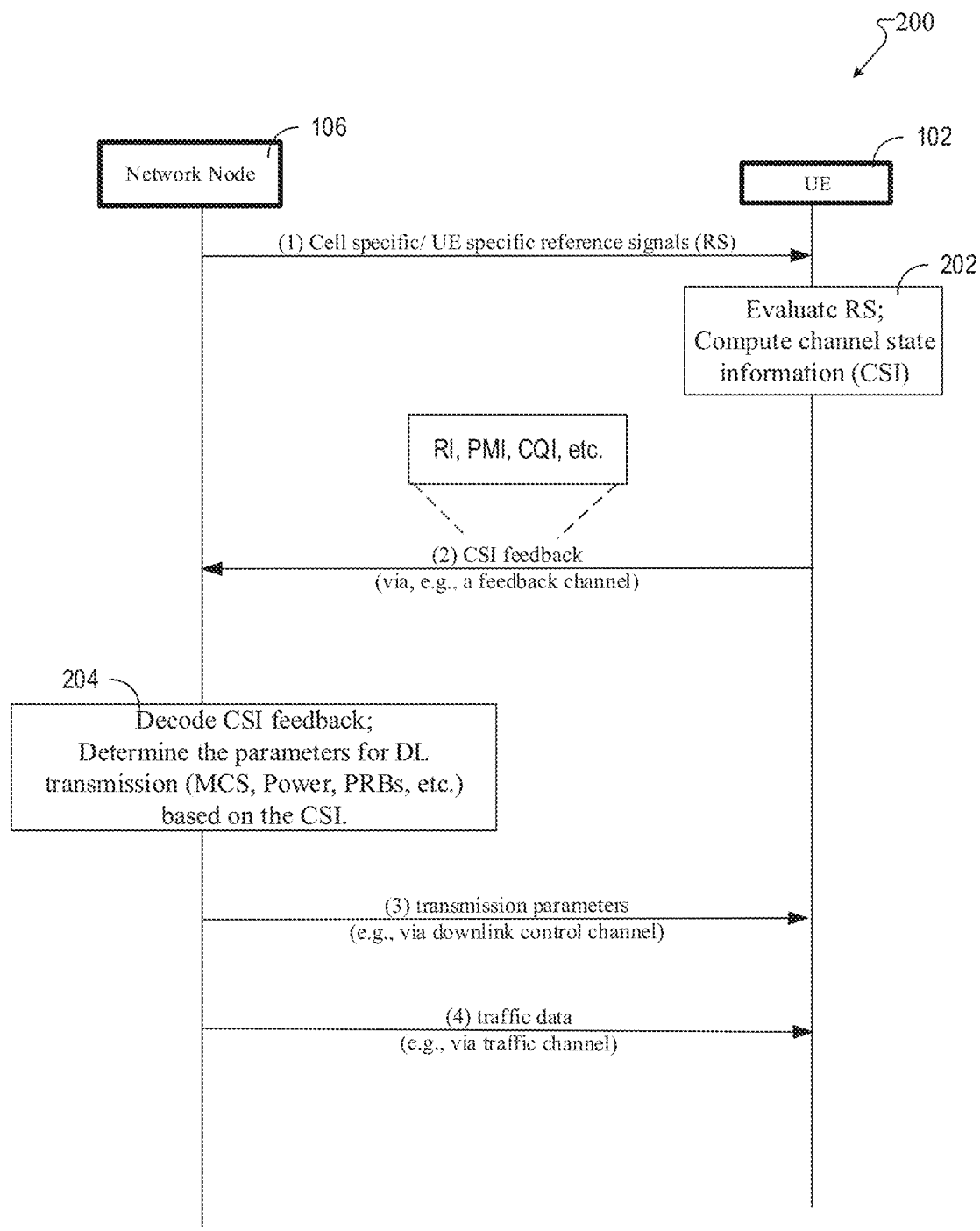
FIG. 2 illustrates an example schematic system block diagram of a message sequence chart between a network node and user equipment according to one or more embodiments.

Referring now to FIG. 2, illustrated is an example schematic system block diagram of a message sequence chart between a network node and user equipment according to one or more embodiments.

FIG. 2 depicts a message sequence chart for downlink data transfer in 5G systems 200. The network node 106 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 106 via a feedback channel either on request from the network node 106, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 106 and then sent over to the user equipment 102 as a part of the downlink control channel data. The network node 106 can transmit the scheduling parameters, comprising the adjusted densities, to the user equipment 102 via the downlink control channel. Thereafter and/or simultaneously, data can be transferred, via a data traffic channel, from the network node 106 to the user equipment 102.

Figure 3:
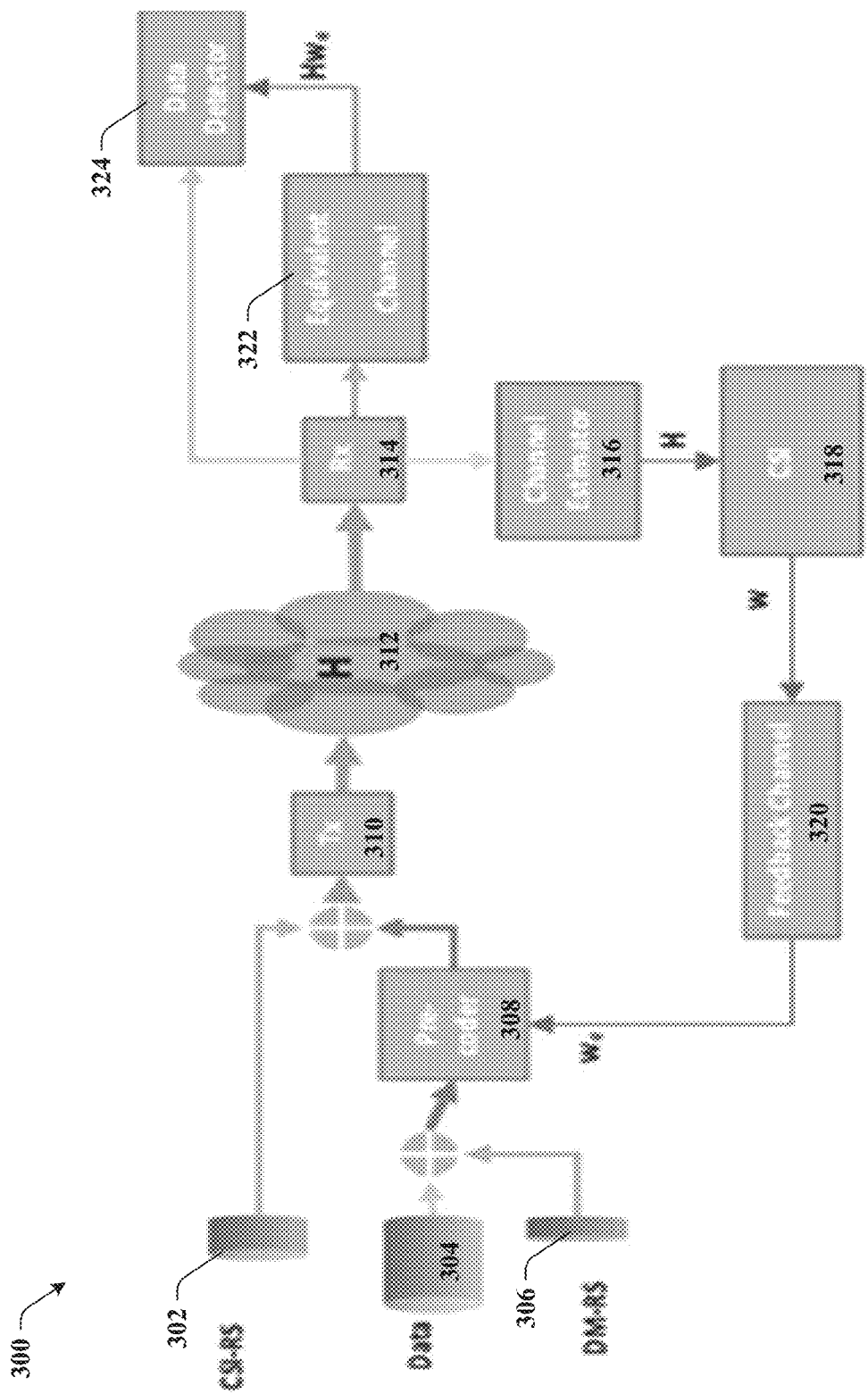
FIG. 3 illustrates an example schematic system block diagram of a multiple-in multiple out system comprising demodulation reference signals according to one or more embodiments.

Referring now to FIG. 3, illustrated is an example schematic system block diagram of a multiple-in multiple out system comprising demodulation reference signals according to one or more embodiments. FIG. 3 depicts a conceptual diagram of a MIMO system generating a demodulation reference signal. At a gNB transmitter (e.g., network node 106), common reference signals, namely CSIRS 302 can be separately transmitted 310 via a channel 312 for channel sounding. A UE 102 receiver 314 can facilitate estimation of channel quality 316 (typically SINR) from the channel sounding, and computes the CSI 318 (e.g., preferred precoding matrix (PMI), rank indicator (RI), and CQI) for the next downlink transmission. The CSI 318 data can then be sent to a pre-coder 308 via a feedback channel 320. Thus, the UE 102 can receive the CSIRS 302, compute the CSI 318 parameters, and transmit the CSI 318 parameters to the network node 106 so that when the network node 106 schedules, it can send the DMRS 306. The DMRS 306 can be pre-coded 308 along with the data 304, so that when the UE 102 receives the OFDM subframe, the UE 102 can estimate the channel, from the DMRS, and use the channel to decode data. Additionally, an equivalent channel 322 can be determined from data received 314. The data received 314 and/or the equivalent channel 322 data can then be sent to a data detector 324.

Figure 4:
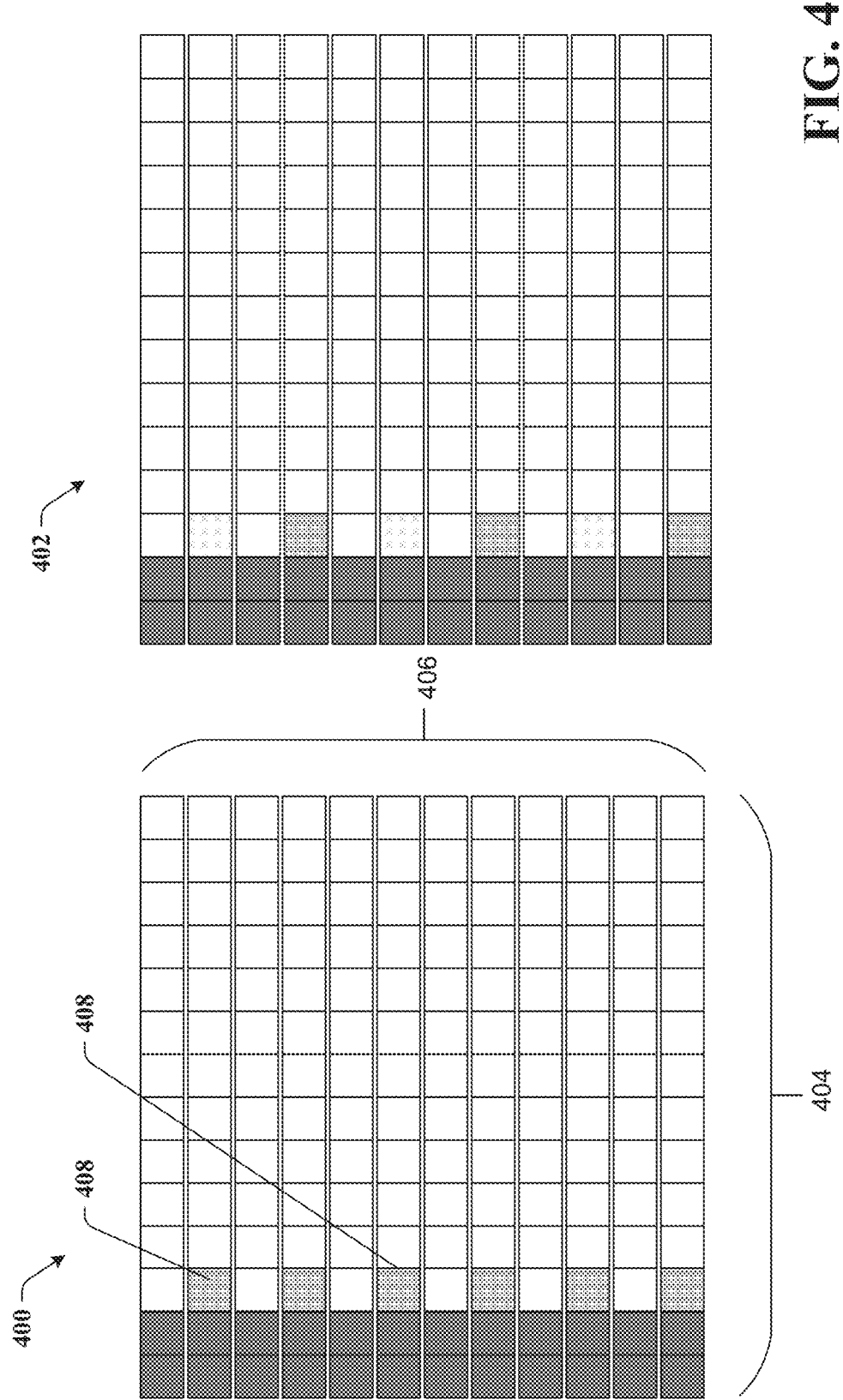
FIG. 4 illustrates an example schematic system block diagram of a demodulation reference signal for an antenna port zero and an antenna port one according to one or more embodiments.
Figure 5:
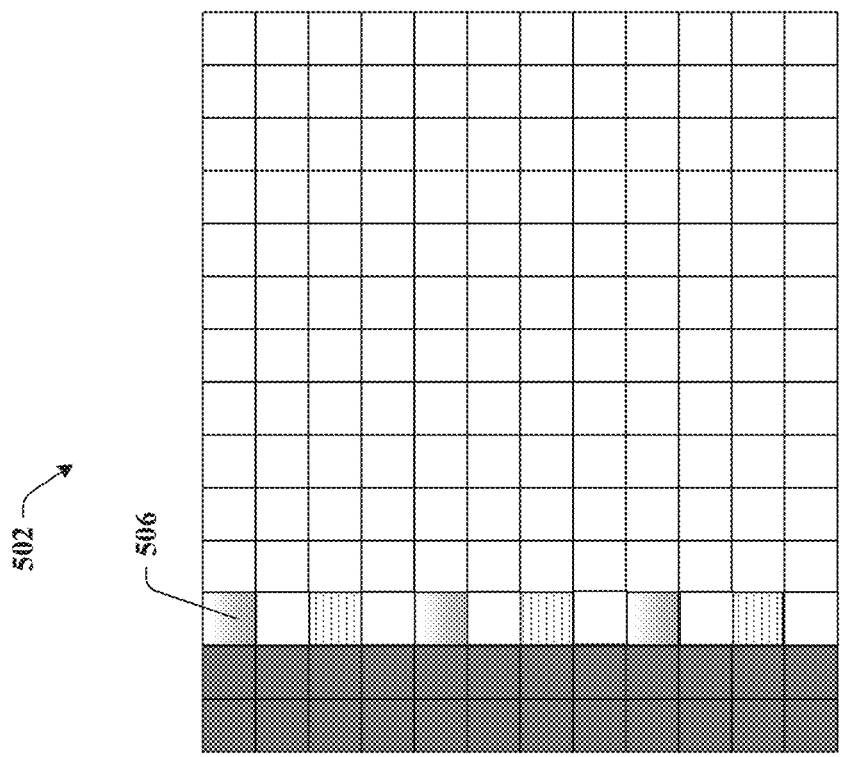
FIG. 5 illustrates an example schematic system block diagram of a demodulation reference signal for an antenna port two and an antenna port three according to one or more embodiments.
Figure 5:
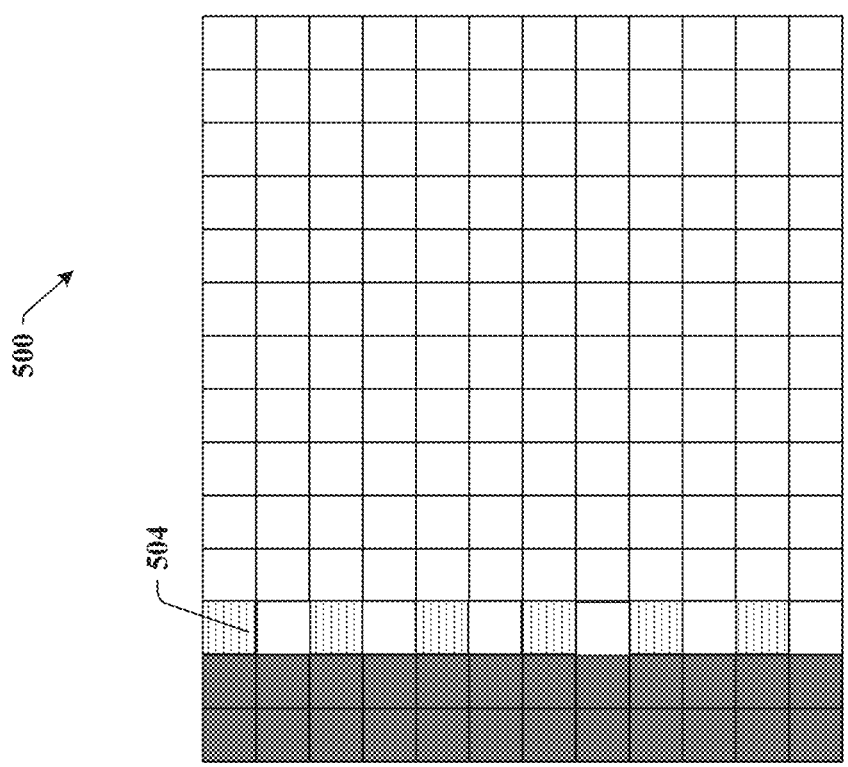

Referring now to FIG. 4 and FIG. 5, illustrated are example schematic system block diagrams of a demodulation reference signal for antenna ports 0, 1, 2, and 3 according to one or more embodiments. A single layer (e.g., rank 1 transmission of port 0) can have 14 OFDM symbols 404, 12 OFDM subcarriers 406, and transmit on the resource blocks 408. For example, as depicted by graph 400, out of 12 resource blocks, the system is transmitting on 6 resource blocks 408. Thus, if the system is scheduled with 50 resource blocks, then graph 400 would be repeated 50 times. Resource blocks 408 indicate that the reference signals are transmitted on those resource blocks 408. Furthermore, code multiplexed means that different signals are multiplied by a code. Consequently, port 0 (e.g., graph 400) and port 1 (e.g., graph 402 are using the same resource element, wherein the port 1 resource elements are code multiplexed.

FIGS. 4 and 5 depict an example of DMRS structure for 4 antenna ports (e.g., maximum 4 layers and 4 DMRS) in an NR system. Graph 400 depicts when the reference symbols within a resource block are transmitted for a single antenna port 0. The same reference symbols can be code multiplexed and transmitted on antenna port 1 as depicted by graph 402. Similarly for ports 2 and 3 of FIG. 5, the same resource elements can be used for transmitting DMRS reference symbols. However the resource elements can be code multiplexed as depicted in the differences between graph 502 from graph 500. These resource elements used for rank 3 and rank 4 (e.g., port 2 and port 3, respectively) are orthogonal in frequency to that of port 0 and port 1.

For antenna port 2 (e.g., graph 500), for the $3^{rd}$ OFDM symbol, they system can use a different frequency timed resource. As shown in graphs 500 and 502, the gaps from graphs 400 and 402 are filled (e.g., the system is transmitting on the other resource blocks not be transmitted on in graphs 400 and 402). Thus, different resource elements are used for transmitting the reference signals on port 2 (e.g., graph 500). For port 3 (e.g., graph 502), the system is using the same resource elements as port 2 (e.g., graph 500) but with code multiplexing as shown by the variation in resource blocks 504 and 506. This is an example of how to transmit a 4 layer transmission in NR. Thus, the various graphs can indicate orthogonal multiplexing.

Figure 6:
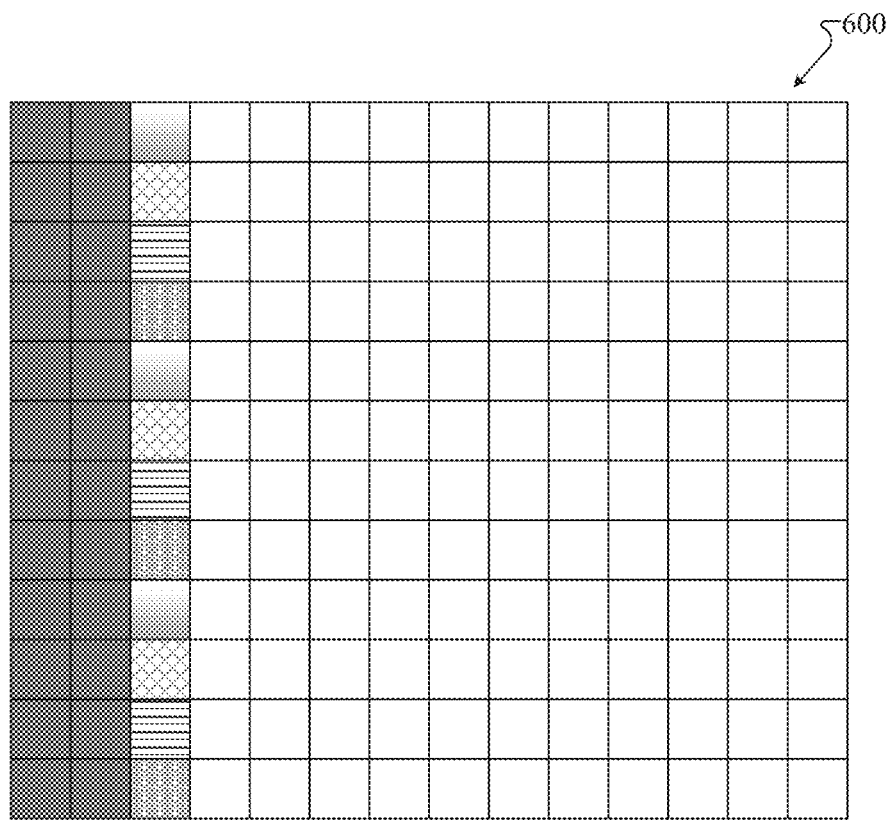
FIG. 6 illustrates an example schematic system block diagram of a demodulation reference signal based on a random sequence according to one or more embodiments.

Referring now to FIG. 6, illustrated is an example schematic system block diagram of a demodulation reference signal based on a random sequence according to one or more embodiments. FIG. 6 depicts the scenario where the system can be transmitting on all 12 resource blocks using a code multiplexer to facilitate the random generation of DMRS signals to reduce the PAPR of the system.

Figure 7:
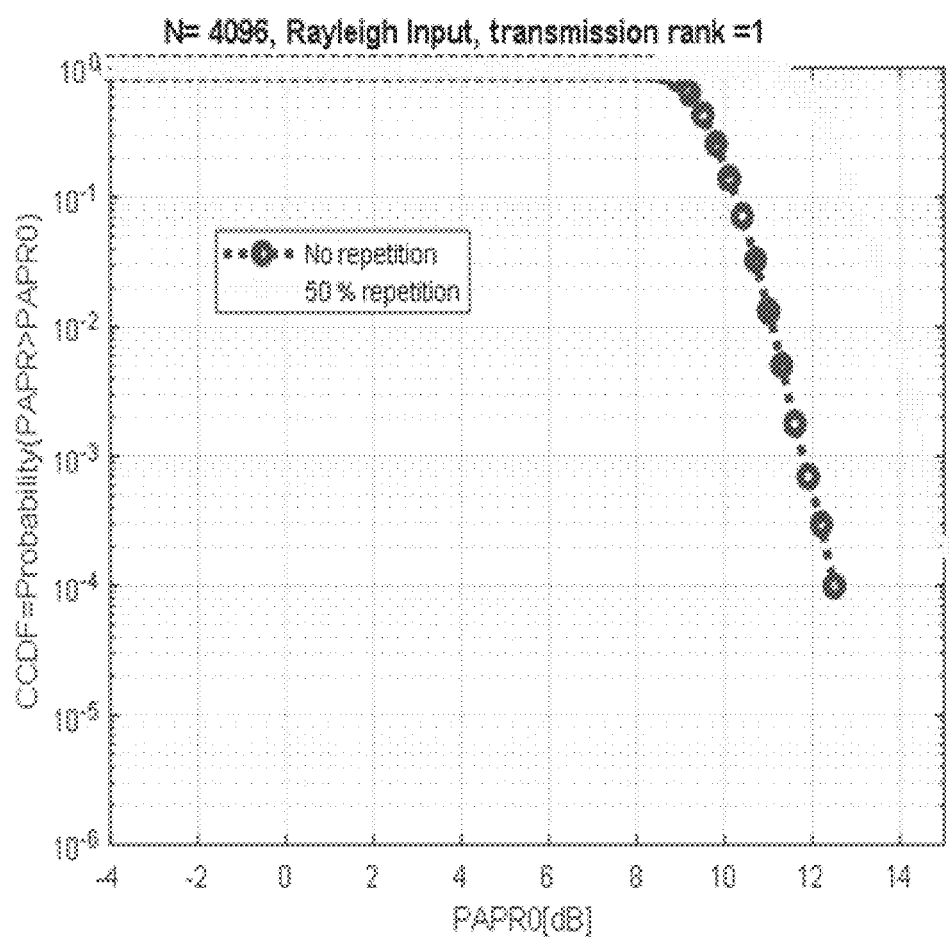
FIG. 7 illustrates an example graph of peak to average power ratio for a rank one transmission with repetition according to one or more embodiments.
Figure 8:
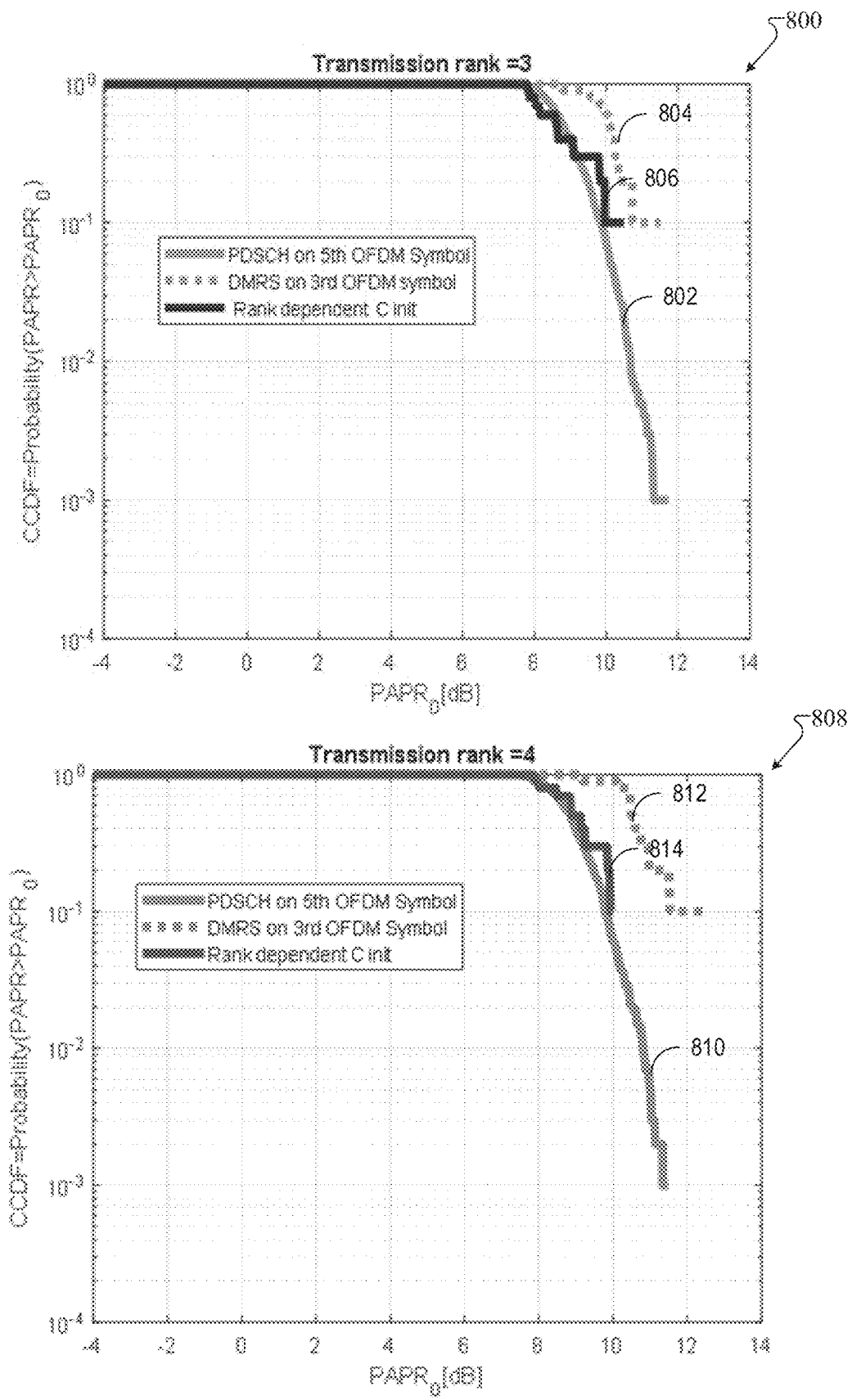
FIG. 8 illustrates are example graphs of peak to average power ratios for rank three and rank four transmissions utilizing a demodulation reference signal sequence generation according to one or more embodiments.

Referring now to FIG. 7 and FIG. 8, illustrated is an example graphs of peak to average power ratio for a rank one transmission with repetition and rank three and rank four transmissions utilizing a demodulation reference signal sequence generation according to one or more embodiments. Because the OFDM can cause the peak power to be more than the average power, the system can be designed with a large variation of ADC and DAC. Port 2 can use the same sequence as port 1, which can cause the same symbol to be repeated. When the symbols are repeated and the IFFT operation is applied, the power is increased. As depicted in FIG. 7, the PAPR at $10^{-3}$ can reach 11.8 dB but if symbols are repeated, then the PAPR at $10^{-3}$ can be 14.5 dB, meaning that there can be approximately a 3 dB improvement in the case of no repetition. FIG. 8 depicts graphs for rank 3 (e.g., graph 800) and rank 4 (e.g., graph 808) transmissions. Thus, lines 806 and 814, which are port dependent, are closer to lines 802 and 810 for no repetition for rank 3 and rank 4 transmissions, respectively. As opposed to lines 804 and 814, which illustrate an increase in PAPR for repeated symbols, for rank 3 and rank 4 transmission, respectively. Thus, for layer dependent DMRS, the PAPR can be reduced as depicted by lines in graphs 800 and 808.

Figure 9:
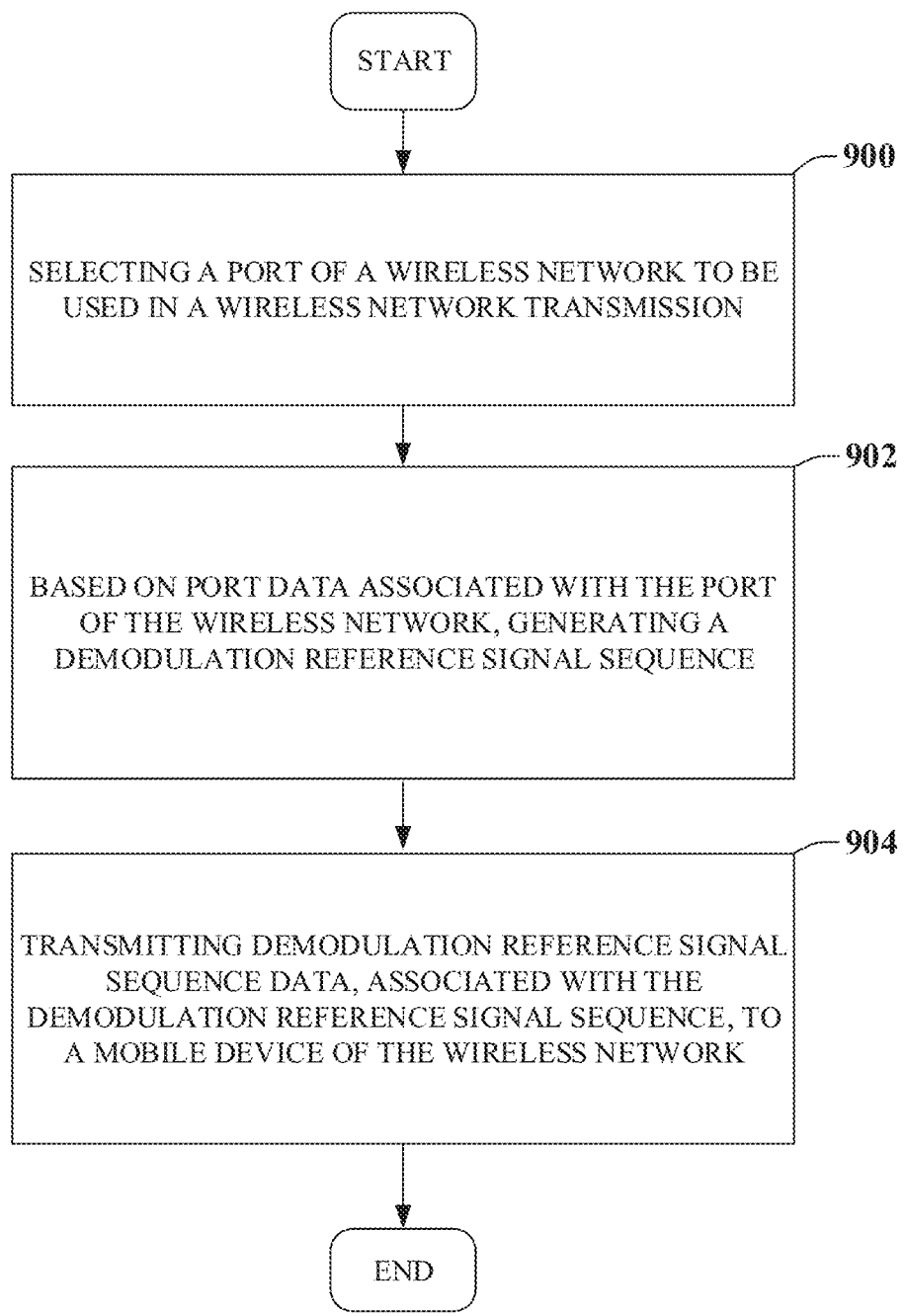
FIG. 9 illustrates an example flow diagram for a method for reducing peak to average power ratios for a 5G network according to one or more embodiments.

Referring now to FIG. 9, illustrated is an example flow diagram for a method for reducing peak to average power ratios for a 5G network according to one or more embodiments. At element 900, a method can comprise selecting (e.g., via the network node 106) a port of a wireless network to be used in a wireless network transmission. At element 902, based on port data associated with the port of the wireless network, the method can comprise generating (e.g., via the network node 106) a demodulation reference signal sequence. Additionally, at element 904, the method can comprise transmitting (e.g., via the network node 106) demodulation reference signal sequence data, associated with the demodulation reference signal sequence, to a mobile device (e.g., UE 102) of the wireless network.

Figure 10:
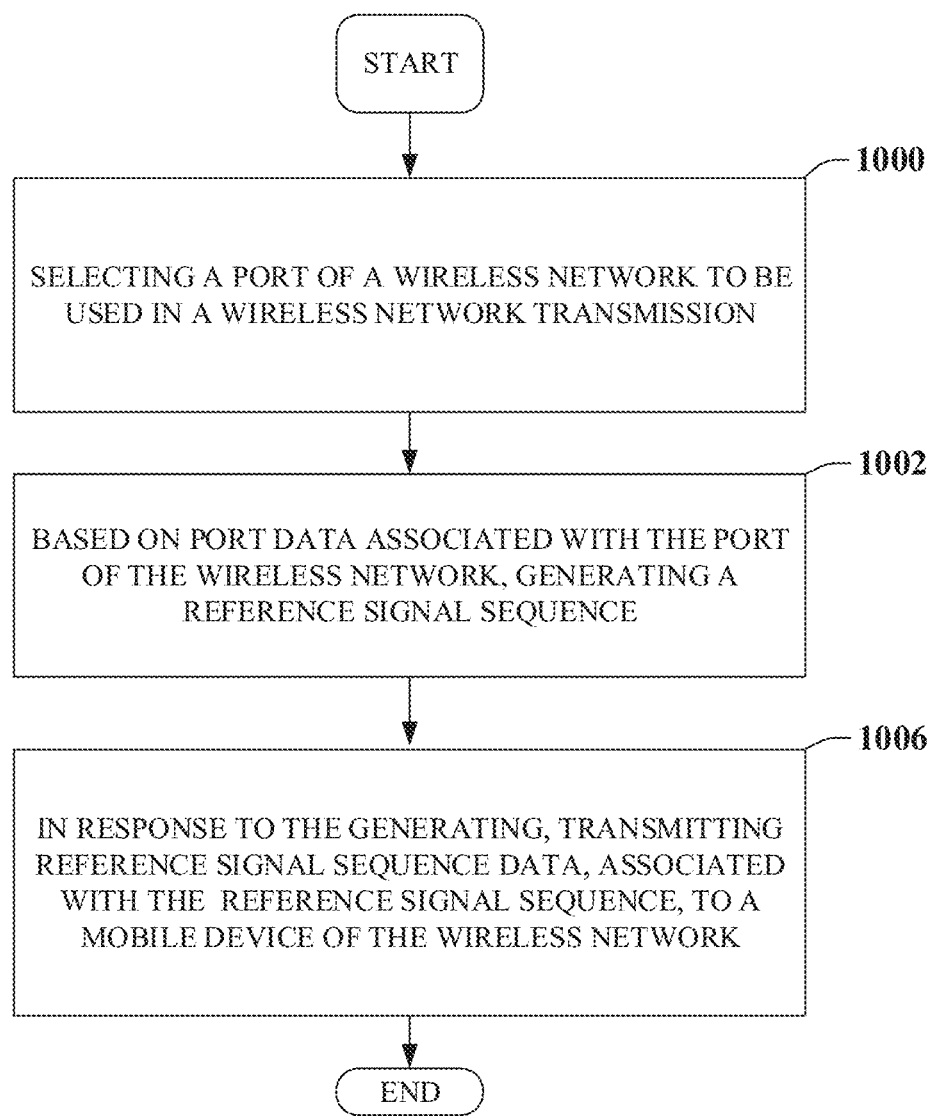
FIG. 10 illustrates an example flow diagram for a system for reducing peak to average power ratios for a 5G network according to one or more embodiments.

Referring now to FIG. 10, illustrated is an example flow diagram for a system for reducing peak to average power ratios for a 5G network according to one or more embodiments. At element 1000, a network device (e.g., via the network node 106) can facilitate, selecting (e.g., via the network node 106) a port of a wireless network to be used in a wireless network transmission. Based on port data associated with the port of the wireless network at element 1002, the network device can generate (e.g., via the network node 106) a reference signal sequence. Furthermore, in response to the generating, the network device can transmit (e.g., via the network node 106) reference signal sequence data, associated with the reference signal sequence, to a mobile device (e.g., UE 102) of the wireless network at element 1004.

Figure 11:
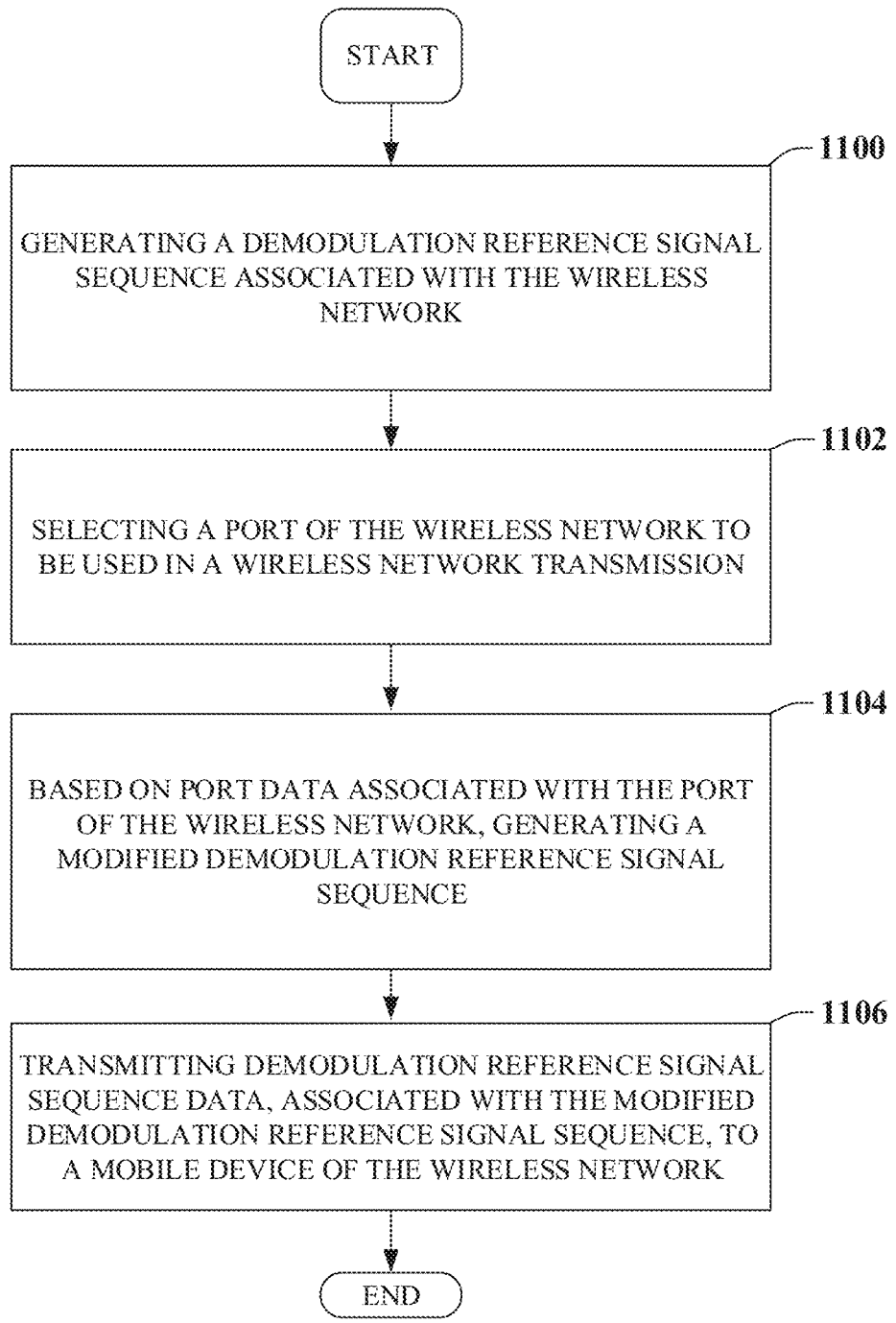
FIG. 11 illustrates an example flow diagram for a machine-readable medium for reducing peak to average power ratios for a 5G network according to one or more embodiments.

Referring now to FIG. 11, illustrated is an example flow diagram for a machine-readable medium for reducing peak to average power ratios for a 5G network according to one or more embodiments. At element 1100, a machine-readable storage medium can perform the operations comprising generating (e.g., via the network node 106) a demodulation reference signal sequence associated with the wireless network. At element 1102, the machine-readable storage medium can perform operations comprising selecting (e.g., via the network node 106) a port of the wireless network to be used in a wireless network transmission. Based on port data associated with the port of the wireless network, the machine-readable storage medium can perform operations comprising generating (e.g., via the network node 106) a modified demodulation reference signal sequence at element 1104. Additionally, at element 1106, the machine-readable storage medium can perform operations comprising transmitting (e.g., via the network node 106) demodulation reference signal sequence data, associated with the modified demodulation reference signal sequence, to a mobile device (e.g., UE 102) of the wireless network.

Figure 12:
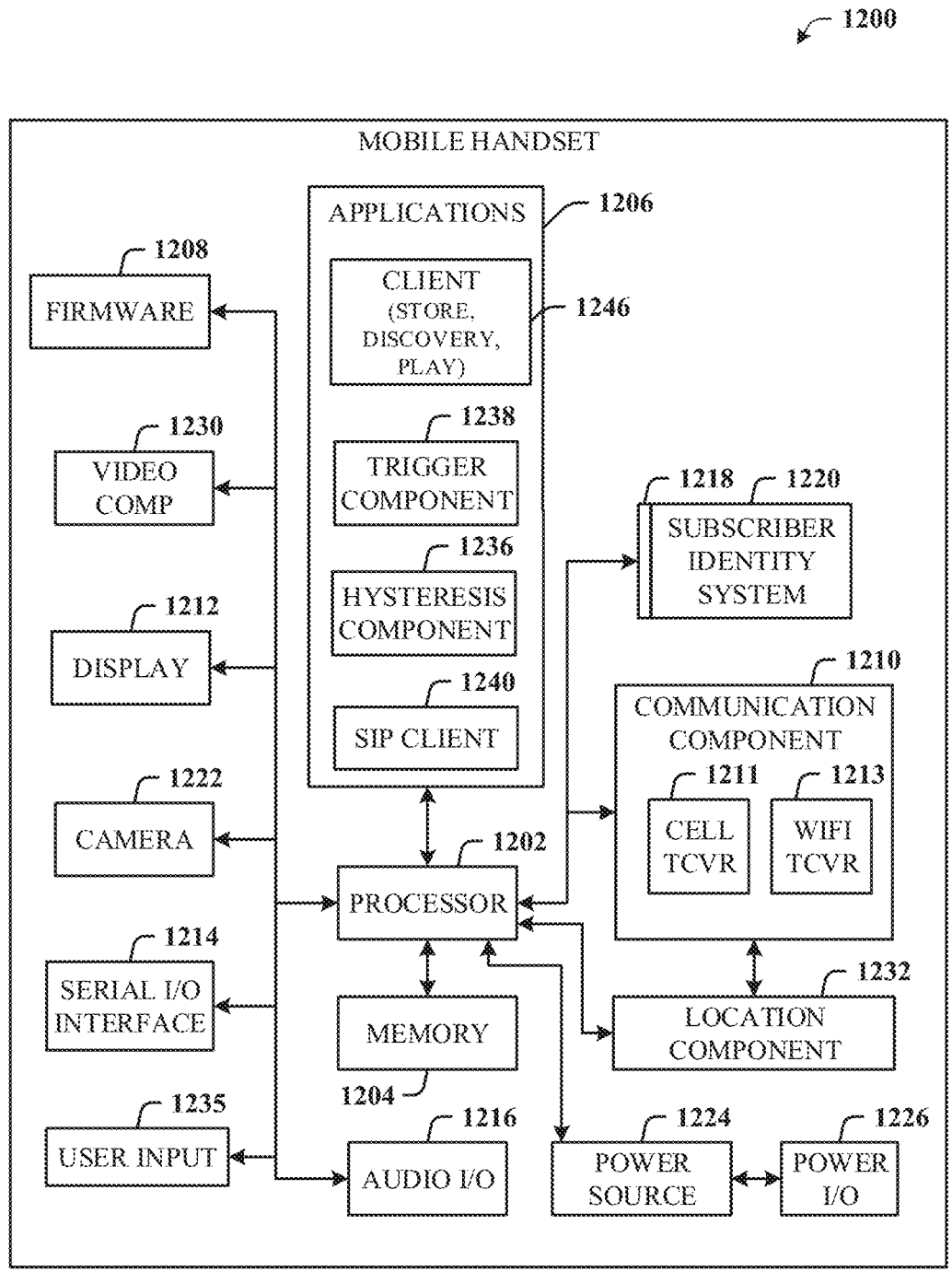
FIG. 12 illustrates an example block diagram of an example mobile handset operable to engage in a system architecture that facilitates secure wireless communication according to one or more embodiments described herein.

Referring now to FIG. 12, illustrated is a schematic block diagram of an exemplary end-user device such as a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Referring now to FIG. 12, there is illustrated a block diagram of a mobile device 1200 operable to execute a system architecture that facilitates establishing a transaction between an entity and a third party. The mobile device 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 13:
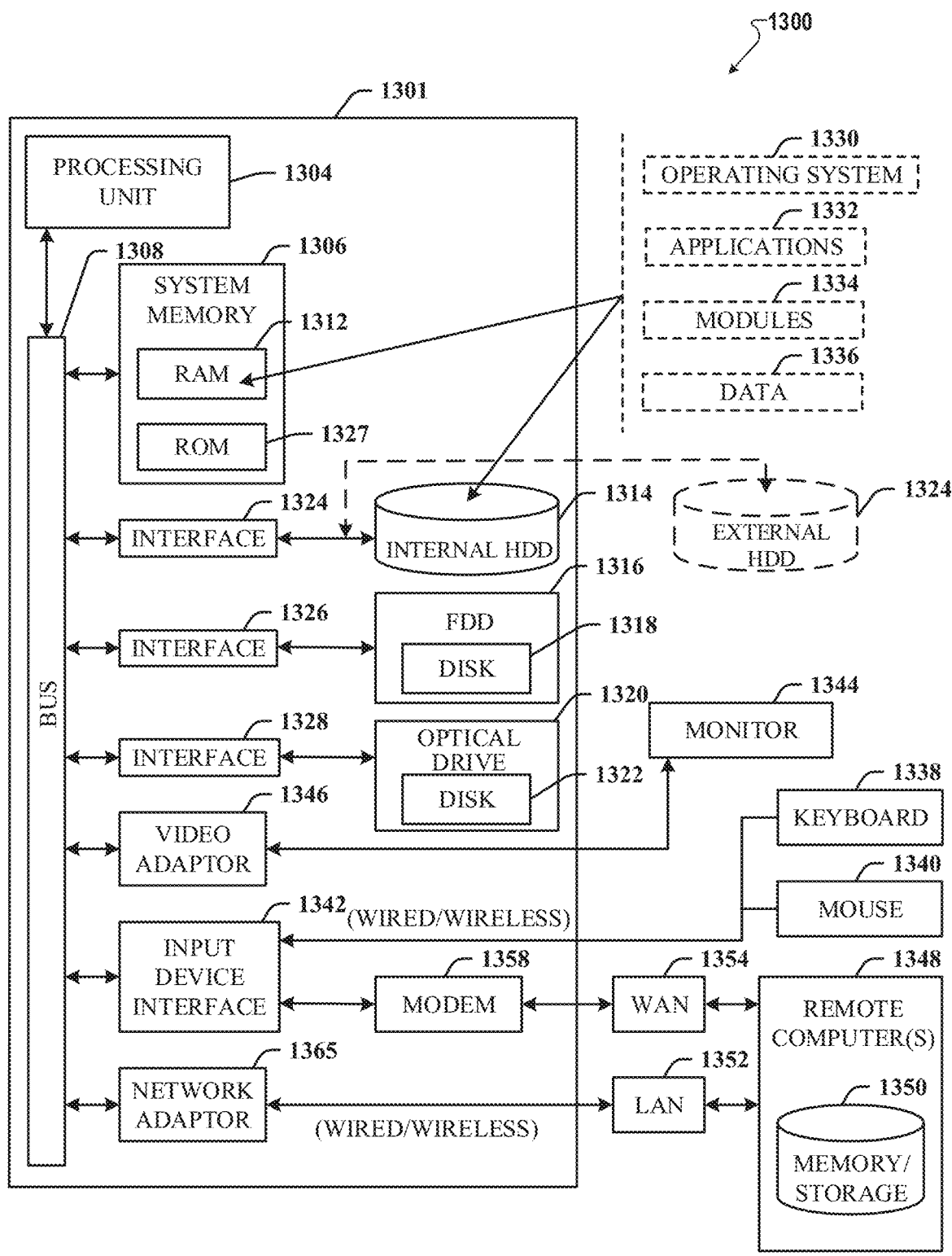
FIG. 13 illustrates an example block diagram of an example computer operable to engage in a system architecture that facilitates secure wireless communication according to one or more embodiments described herein.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The use of control parameters to adjust NR radio ON/OFF and preserve batter life is an improvement in the state of the art. For example, the control parameters can comprise scan timer a sleep timer. The A mobile device can decode a network message, turn on a new radio (NR), and enable the scan timer. If a NR cell is available, the mobile device can enter evolved universal terrestrial radio access in response to the network message. Conversely, when the scan timer expires, the mobile device can turn off the NR radio, and enable the sleep timer to preserve the mobile device battery. When the sleep timer expires, the mobile device can turn on the NR radio and enable the scan timer.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    based on rank data, selecting, by network equipment comprising a processor, a first network port to be used in a network transmission;
    based on port data associated with the first network port, generating, by the network equipment, a randomized demodulation reference signal sequence that is different than a previously utilized demodulation reference signal sequence that is associated with a second network port;
    in response to generating the randomized demodulation reference signal sequence, precoding, by the network equipment, the randomized demodulation reference signal sequence, resulting in precoded demodulation reference signal sequence data representative of a precoded demodulation reference signal sequence;
    multiplexing, by the network equipment, a resource element by a code, resulting in a code multiplexed resource element; and
    in response to precoding the randomized demodulation reference signal sequence, transmitting, by the network equipment via the first network port, the precoded demodulation reference signal sequence data to a user equipment, wherein transmitting the precoded demodulation reference signal sequence utilizes the code multiplexed resource element.

2. The method of claim 1, further comprising:
    inserting, by the network equipment, the precoded demodulation reference signal sequence data into an orthogonal frequency division multiplexing grid.

3. The method of claim 2, wherein the randomized precoded demodulation reference signal sequence data is associated with the first network port different than the second network port associated with a previous precoded demodulation reference signal sequence.

4. The method of claim 1, wherein generating the randomized demodulation reference signal sequence comprises generating the randomized demodulation reference signal sequence that reduces a peak to average power ratio associated with a network comprising the network equipment.

5. The method of claim 1, wherein the previously utilized demodulation reference signal sequence comprises a non-random sequence.

6. The method of claim 1, wherein the port data is generated in response to a downlink transmission between the network equipment and the user equipment.

7. The method of claim 1, wherein the port data is generated in response to an uplink transmission between the network equipment and the user equipment.

8. Network equipment, comprising:
    a processor; and
    a memory that stores executable instructions that, when executed by the processor, facilitate performance of operations, comprising:
    based on rank data, selecting a first network port of a network to be used in a network transmission;
    based on port data associated with the first network port, generating a randomized reference signal sequence that is different than a than a previously utilized reference signal sequence that is associated with a second network port;
    in response to generating the randomized reference signal sequence, precoding the randomized reference signal sequence, resulting in a precoded reference signal sequence;
    multiplexing a resource element by a code, resulting in a code multiplexed resource element; and
    in response to precoding the randomized reference signal sequence, transmitting, via the first network port, the precoded reference signal sequence data, associated with the precoded reference signal sequence, via the code multiplexed resource element, to a user equipment.

9. The network equipment of claim 8, wherein the precoded reference signal sequence is a channel state data reference signal sequence.

10. The network equipment of claim 8, wherein the precoded reference signal sequence is a demodulation reference signal sequence, and wherein selecting the first network port comprises changing the first network port to the second network port.

11. The network equipment of claim 8, wherein transmitting the reference signal sequence data comprises transmitting the reference signal sequence data for network ports to prevent an orthogonal frequency division multiplexing symbol repetition.

12. The network equipment of claim 8, wherein generating the previously generated reference signal sequence comprises a random sequence.

13. The network equipment of claim 8, wherein the first network port is associated with a rank associated with a network comprising the network equipment.

14. The network equipment of claim 8, wherein the first network port is associated with a layer associated with a network comprising the network equipment.

15. A non-transitory machine-readable medium, comprising executable instructions that, when executed by a processor of network equipment, facilitate performance of operations, comprising:

generating a demodulation reference signal sequence associated with a first network port;

in response to generating the demodulation reference signal sequence, precoding the demodulation reference signal sequence, resulting in a precoded demodulation reference signal sequence;

based on rank data, selecting a second network port to be used in a network transmission;

based on port data associated with the second network port, generating a randomized precoded demodulation reference signal sequence that is different than the demodulation reference signal sequence;

multiplexing a resource element by a code, resulting in a code multiplexed resource element; and transmitting, via the first network port and in accordance with the code multiplexed resource element, demodulation reference signal sequence data, associated with the randomized precoded demodulation reference signal sequence, to a user equipment.

16. The non-transitory machine-readable medium of claim 15, wherein the first network port is associated with a first rank that is different than second rank associated with the second network port.

17. The non-transitory machine-readable medium of claim 15, wherein the port data is generated in response to an uplink transmission between the network equipment and the user equipment.

18. The non-transitory machine-readable medium of claim 15, wherein the port data is generated in response to a downlink transmission between the network equipment and the user equipment.

19. The non-transitory machine-readable medium of claim 15, wherein the operations further comprise:

inserting the precoded demodulation reference signal sequence data into a data structure associated with an orthogonal frequency division multiplexing grid.

20. The non-transitory machine-readable medium of claim 15, wherein generating the randomized precoded demodulation reference signal sequence is performed in response to the network equipment utilizing frequency division multiplexing.

* * * * *